United States Patent [19]

Hodgetts

[11] Patent Number: 4,948,325
[45] Date of Patent: Aug. 14, 1990

[54] CONTROL APPARATUS FOR A LOADING-MOVING SYSTEM

[75] Inventor: Graham L. Hodgetts, Mars, Pa.

[73] Assignee: Rolflor Industries, Evans City, Pa.

[21] Appl. No.: 440,443

[22] Filed: Nov. 22, 1989

Related U.S. Application Data

[63] Continuation of Ser. No. 238,062, Aug. 30, 1988, abandoned.

[51] Int. Cl.$^5$ .............................................. B65G 67/02
[52] U.S. Cl. .................... 414/527; 414/467; 242/75.53; 198/750
[58] Field of Search ............... 414/390, 395, 398, 400, 414/467, 527, 528, 523; 198/750; 242/75.53, 75.45, 57

[56] References Cited

FOREIGN PATENT DOCUMENTS

| 244114 | 12/1965 | Austria | 242/75.53 |
| 474943 | 11/1937 | United Kingdom | 414/527 |
| 704798 | 3/1954 | United Kingdom | 242/75.53 |

Primary Examiner—Frank E. Werner
Attorney, Agent, or Firm—Fleit, Jacobson, Cohn, Price, Holman & Stern

[57] ABSTRACT

A loading and unloading system for trucks and trailer has a conveyor belt extending along a bed of a truck or trailer between front and rear wind-up rolls. For loading the vehicle the conveyor belt is wound onto the front roll and for unloading the vehicle it is wound onto the back roll. In order to prevent the belt from being pulled off the respective rolls a control system is provided which has a follower engaging the outer surface of the belt wound on one of the rolls. When the roll attains a predetermined maximum or minimum diameter depending on the amount of belt wound thereon, the follower operates a hydraulic valve to terminate the drive for the belt. The control operates in one direction responsive to a maximum predetermined diameter and in the other direction responsive to a minimum predetermined diameter.

10 Claims, 3 Drawing Sheets

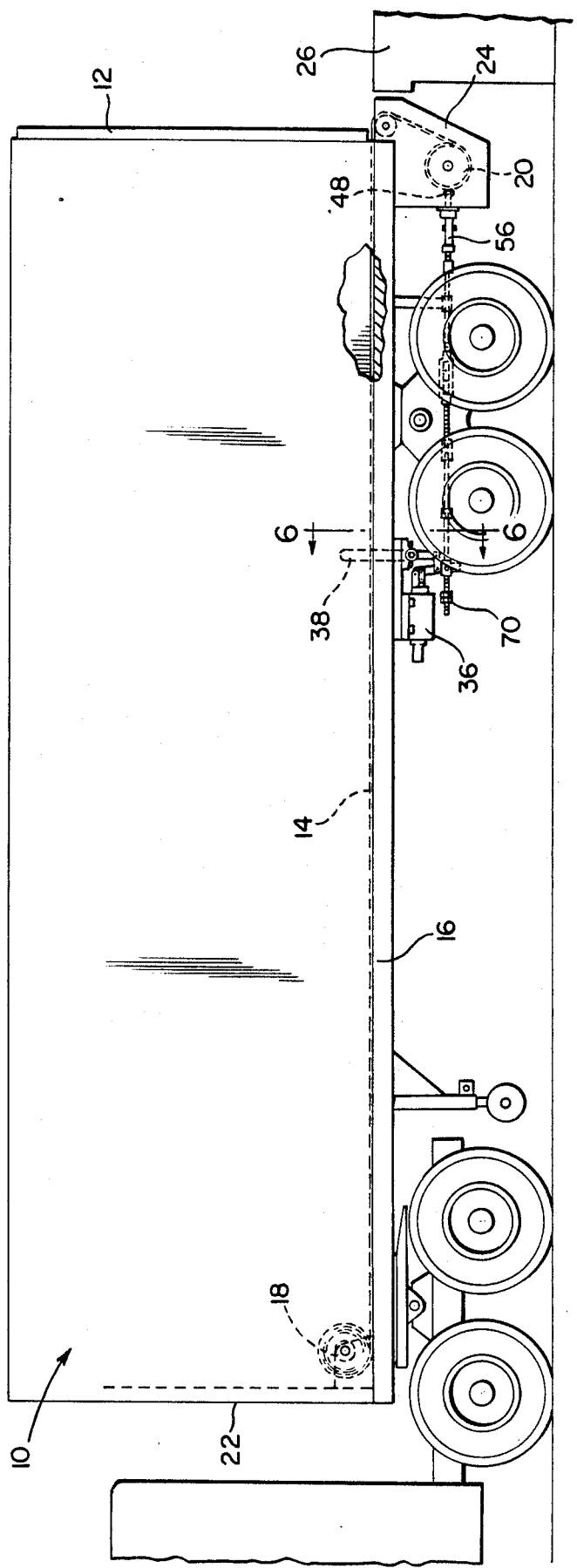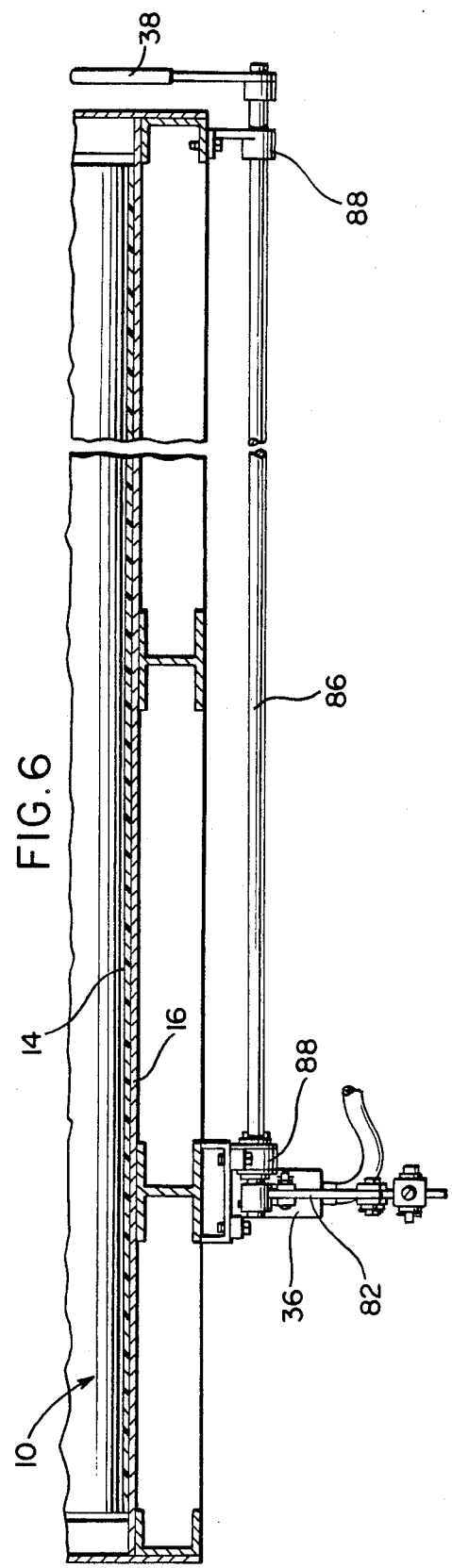

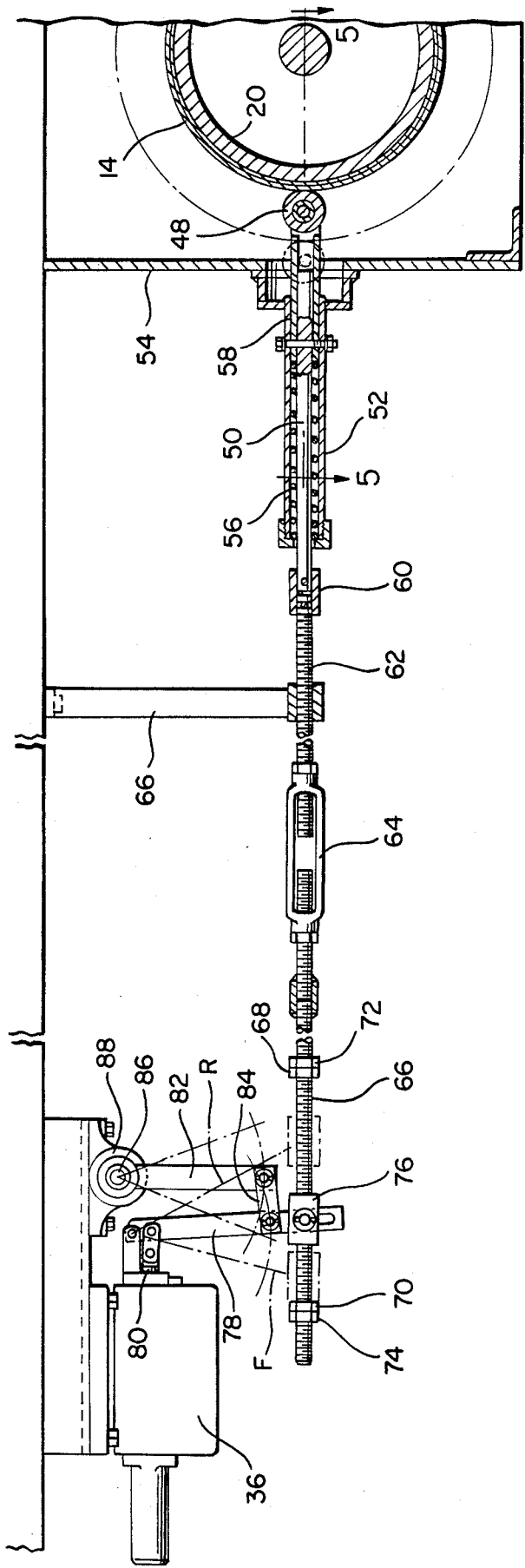
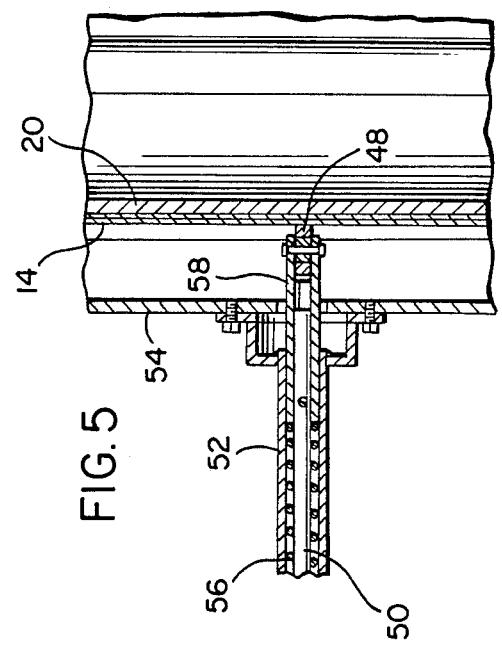
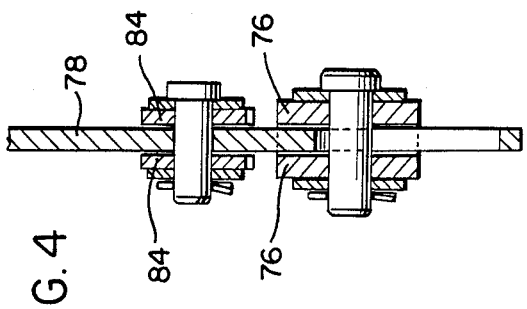
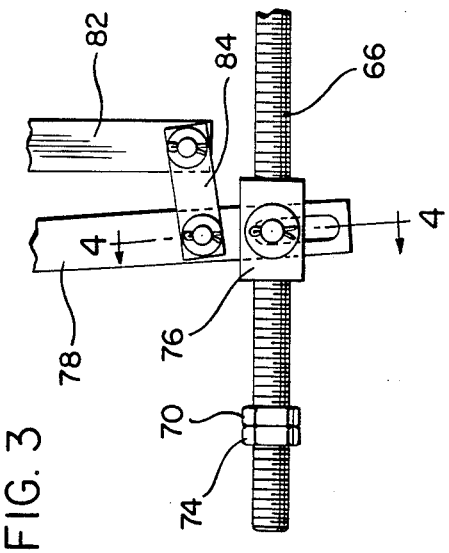
FIG. 2
FIG. 5
FIG. 4
FIG. 3

CONTROL APPARATUS FOR A LOADING-MOVING SYSTEM

This application is a continuation of application Ser. No. 238,062, filed Aug. 30, 1988, now abandoned.

BACKGROUND OF THE INVENTION

This invention relates to conveyor-type load-moving systems having a load-moving belt or band which extends between respective wind-up rolls and is wound on one or other of the rolls to move the load in one or other direction.

A load-moving system of the above type may be used for example on trucks or trailers for loading or unloading the vehicle through the back end thereof by means of a powered conveyor belt or band extending along the bed of the vehicle between front and rear wind-up rolls. Thus, the belt or band may be attached at its forward end to a front wind-up roll which is located internally of the truck or trailer adjacent its front wall and the rear end of the belt or band may be attached to a rear wind-up roll which may be located externally under the back end of the truck or trailer. When loading the vehicle, the belt or band is wound onto the front roll, by driving the front roll and, conversely, for unloading the truck or trailer, the belt or band is wound onto the back roll by driving this roll. The rear wind-up roll may, for example, be located in a casing slung beneath the back end of the truck or trailer.

A conveyor-type load-moving system of the above type can also be used on a stationary body such as a loading dock. It is desirable in loading and unloading systems of the above type to provide some form of remote control for the drive mechanisms used to operate the respective wind-up rolls so that the loading and unloading can be controlled by an operator outside of the vehicle. It is further desirable to provide means within the control system to prevent the belt or band from being pulled off a respective wind-up roll or drum by overwinding the other roll or drum one means for preventing the belt or band from being pulled off the drums includes the use of a proximity switch sensing a metal tab or the like fixed to the belt at an appropriate point and shutting down the drive mechanism in response to the tab being sensed. This form of control means is useful for loading and unloading to and from a loading dock because it allows an operator to work through a push button control pendant at the end of an electrical cable. This form of control system, however, also has relatively delicate components and may not therefore be suitable for use in certain applications where, for example, bulk materials such as refuse are to be handled and where the belt or band may be subject to heavy duty use. Accordingly, the present invention provides an alternative form of control system for preventing the belt or band from being pulled off the wind up rolls or drums at the opposite ends of its travel.

SUMMARY OF THE INVENTION

It is an object of the invention to provide a mechanically-based control mechanism for the conveyor belt or band of a load-moving system as described above, which can more readily accommodate heavy duty use in refuse and like loading applications, which is relatively simple and economical to install and simple to use by an operator externally of the vehicle.

In a control system in accordance with the invention, therefore, there is provided a follower roller or the like adapted to engage the surface of the conveyor belt or band on one of the wind-up rolls or drums, conveniently, in the case of a vehicle loading and unloading system, the rear end wind-up roll or drum so that the follower roller moves in and out, radially, as the length of conveyor belt or band on the respective roll or drum diminishes or increases. The follower roller may be carried on the end of an elongate rod assembly or the like extending lengthwise of the vehicle, for example externally under the bed of the vehicle, and the rod assembly for example being supported under the vehicle body by suitable suspension brackets or the like.

At its forward end, the rod assembly carries a pair of spaced trip nuts and a lever bushing located between the respective trip nuts. The bushing is connected to a control lever of a hydraulic directional control valve mounted under the body of the vehicle. The control valve is a spool-type valve, the control lever being connected to the spool, which has a first terminal position for directing hydraulic fluid (in a hydraulic drive circuit) to a drive motor for the front end conveyor belt wind-up roll, a second terminal position for directing hydraulic fluid to a drive motor for the rear end wind-up roll or drum and a central neutral position in which neither motor is operated. The mechanism further includes a manual operating assembly for selectively positioning the control lever of the hydraulic valve in the respective terminal positions for operating the respective drum drive motors.

In operation, when the control valve lever is set to operate the forward wind-up roll, the follower roller engaging the belt surface on the rear wind-up roll will move progressively inwardly as the length of conveyor belt on the rear roll decreases. When a length of belt sufficient to have moved an entire load into the vehicle has been unwound from the rear roll, the follower roller reaches an inner point at which there has been sufficient travel of the rod assembly to cause one of the aforementioned trip nuts to engage the lever bushing and move the valve operating lever to the neutral position thereby terminating the drive. Similarly, when the valve lever is placed in the opposite position for unloading the vehicle, the amount of belt on the rear roll will gradually increase moving the follower roller and rod assembly outwardly until the other trip nut engages the lever bushing and again moves the control valve operating lever to the neutral position. Preferably, the valve may be of the type in which the spool is sprung back to the neutral position.

It is evident that the system provides a relatively simple mechanical means for controlling operation of the conveyor belt or band in both directions, and automatically stopping the belt or band when it has moved sufficiently to load and unload the vehicle. Various mechanical adjustments are readily provided in the system for accurately adjusting the amount of travel of the belt before it is stopped.

Additional features and advantages of the invention will become apparent from the ensuing description and claims read in conjunction with the attached drawings.

BRIEF DESCRIPTION OF DRAWINGS

FIG. 1 is a side elevational view of a trailer having a loading and unloading system and control mechanism in accordance with the invention;

FIG. 2 is an enlarged part sectional elevational view of the control mechanism shown in FIG. 1;

FIG. 3 is a further enlarged detailed view of part of the control mechanism linkage;

FIG. 4 is still further enlarged view on line 4—4 of FIG. 3;

FIG. 5 is a sectional view on lines 5—5 of FIG. 2;

FIG. 6 is an enlarged sectional view on line 6—6 of FIG. 1; and

DESCRIPTION OF PREFERRED EMBODIMENTS

Figure 7:
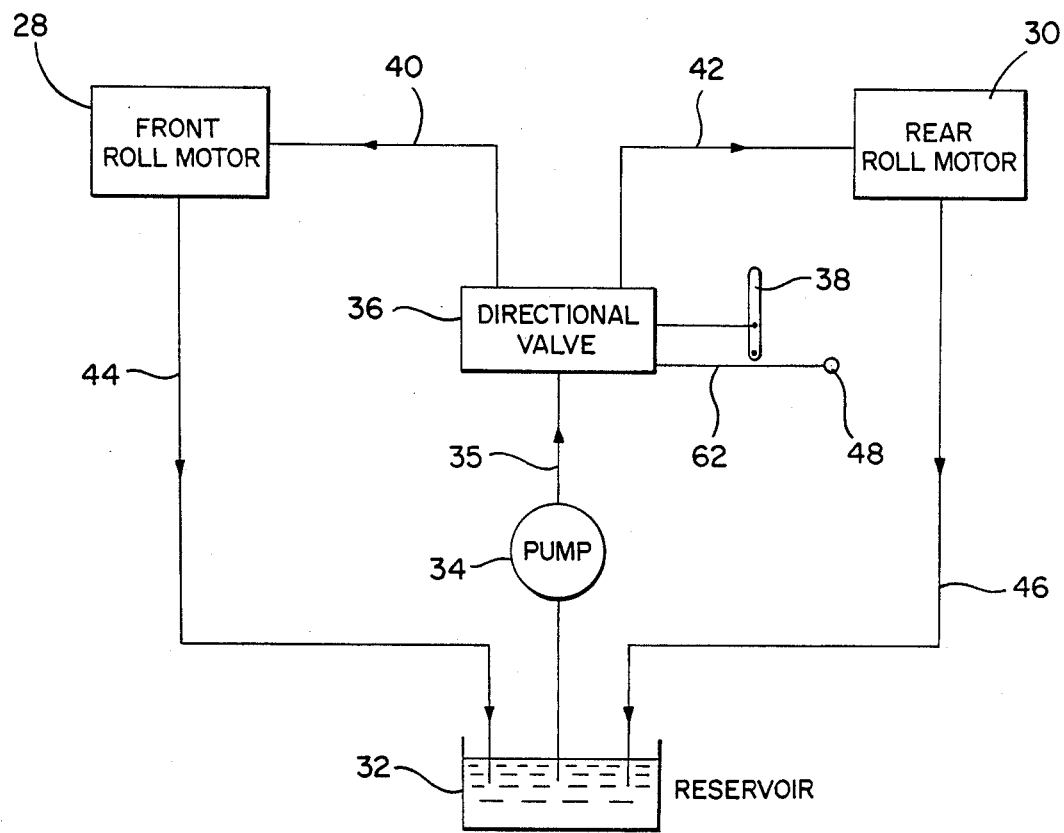
FIG. 7 is a hydraulic circuit diagram for the loading and unloading system.

As shown in FIG. 1, a conventional style freight trailer 10 having a back end opening with a door or doors 12 is provided with a loading and unloading mechanism generally in the form of a conveyor belt or band 14 which extends internally along the bed 16 of the trailer with a forward end of the belt being secured to a front end wind-up roll 18 and a back end of the belt being secured to a back end wind-up roll 20. The front end wind-up roll 18 is located internally of the trailer adjacent a front wall 22 and the back end roll 20 may be slung beneath the trailer and secured in a suitable casing 24. When loading the trailer, the belt 14 is wound onto the front roll 18 to draw a load for example from a loading dock 26 into the trailer while, on the other hand, to unload the trailer, the belt is wound onto the back roll 20. The length of the belt is two times the length of the bed of the trailer with sufficient extra belt to provide a degree of excess winding on each roll.

The front roll 18 is provided with a first drive mechanism which includes a front roll drive motor 28, see FIG. 7, and the rear roll 20 is provided with a similar drive mechanism including a rear roll hydraulic drive motor 30. The respective drive mechanisms for the front and rear wind-up rolls may, for example, be of a type disclosed in my earlier U.S. Pat. No. 4,760,971, and pending U.S. patent application Ser. No. 130,999, filed Dec. 10, 1987, the contents of which are expressly incorporated herein by reference. Referring to FIG. 7, it will be noted that hydraulic fluid for selectively driving the respective motors 28 or 30 is derived from a hydraulic reservoir 32 via a pump 34 and a directional valve 36 which may be set manually by means of a control lever 38 to direct hydraulic fluid selectively to either one of the motors 28 or 30. The directional valve has first and second outlet conduits 40 42 respectively leading to the respective motors and further conduits 44 46 return liquid from the motors to the reservoir. When either one of the motors 28 or 30 is to be operated either to load or unload the trailer, the directional valve is set manually via lever 38, which is conveniently located at one side of the trailer, in order to direct liquid to the respective motor. In accordance with the invention, a mechanism is provided for automatically stopping the respective motor when the belt 14 has travelled a sufficient distance either to load or unload the vehicle, and to ensure that the belt is not pulled off of the respective wind-up roll by continued operation of one of the motors. The control mechanism will be described in more detail below.

A roller 48 is carried at the back end of a first end of a first rod 50 supported in a tubular guide 52 attached to a front wall 54 of the casing 24 so that the roller engages the surface of belt 14 where is wound on roll 20. A coil spring 56 surrounds the rod 50 within a sleeve 52 and applies pressure against a sleeve 58 secured to the rod so as to urge the roller 48 into contact with belt 14. Rod 50 is secured at its forward end by a bushing, collar, or the like 60 to a first threaded rod 62 itself attached to a turnbuckle arrangement 64. Rod 62 is supported beneath the trailer by a slide bracket 66. The turnbuckle 64 at its forward end is secured to a second threaded rod 66 on which are threaded an unloading trip nut 68 and a loading trip nut 70, the trip nuts being provided with respective lock nuts 72, 74 for retaining them in position on the rod. Between the trip nuts 68 and 70, a lever bushing 76 is slidably received on rod 66. The lever bushing 76 is pivotally connected with a first actuating lever 78 for positioning a valve spool 80 of the directional control valve 36.

At this point it is convenient to state that the control valve 36, may, for example, be a valve of the type manufactured and sold by Husco Division of Waukesna, Wisc. under their catalog and Ser. No. 6000 A56A. This valve, as previously referred in connection with FIG. 7 is of a type having an inlet 35 for receiving fluid from pump 34, and two outlets for delivering fluid from the pump selectively to either of the conduits 40 or 42. Additionally, the valve has a neutral position in which communication between the inlet and both outlets is closed. Spool 80 can be moved manually by the lever 38 from the neutral position into either one of the operating positions in which fluid is directed to the respective motor. Additionally, the valve has an internal spring detent mechanism for returning the spool from either operative position to the neutral position responsive to external pressure forces suitably directed on the spool via the lever 78, as will be described. The above noted Husco model valve is only one spring detent-return type directional valve, commercially available which is suitable for use in the apparatus, and other similar valves are equally suitable.

A pivot arm 82 is connected to the actuating lever 78 by a pivot link 84 the upper end of arm 82 being carried on a cross shaft 86 mounted in suitable bushings 88 slung beneath the trailer. The previously referred to manual operating lever 38 is secured to the cross shaft 86.

In the position of the operating lever 78 shown in solid line FIG. 2, the directional valve 36 is in the neutral position, so that there is no supply of pressure fluid to either of the wind-up roll drive motors 28 or 30. When loading of the trailer is required, the manual lever 38 is moved so as to bring the operating lever 78 of valve 36 into a forward position indicated by the chain-dotted line F in FIG. 2, whereby motor 28 for the front wind-up roll is operated thereby winding the belt 14 onto the front roll and loading the trailer. Winding the belt off the rear roll 20 causes the follower roller 48 and the rod assembly comprising the rods 50, 62 and 66 to move radially inwardly, to the right as shown in FIG. 2 whereby at a predetermined position, the loading trip nut 70 will contact the lever bushing 76 and move same to the right thereby springing the valve spool 80 into the neutral position and stopping the drive to the front wind-up roll. The positioninq of the trip nut 70 relative to the bushing 76 and the follower roller 48 is adjusted so that the termination of the drive will be effected when the load has been moved fully into the trailer and when there is still a certain amount of belt remaining on the rear roll 20. Thus, a loading operation is commenced manually by operation of lever 38 and is terminated automatically when the trip nut 70 moves the bushing 76. It will be evident that adequate adjustment facility is provided for the amount of belt to be unwound by means of adjustment of the trip nuts on rod 60 and by means of the turnbuckle 64.

It is also evident from the above that when unloading the trailer, lever 38 is moved in the opposite direction to bring the operating lever 78 into a reverse position indicated by R in FIG. 2 thereby supplying pressure fluid to the motor 30 for driving the rear wind-up roll. The belt 14 will be progressively wound onto the rear roll 20 thereby increasing its diameter and pushing the follower roller 48 outwardly to the left in FIG. 2 until the unloading trip nut 68 engages the bushing 76 and again returns the spool valve 36 to the neutral position, thereby terminating the drive.

The invention accordingly provides a simple mechanical means for controlling operation of the loading and unloading conveyor belt in a manner whereby the belt is automatically stopped when the load has been moved through a required distance and in a manner preventing the belt from being pulled off the respective wind-up rolls. While only a preferred embodiment of the invention has been described herein in detail, the invention is not limited thereby and modifications can be made within the scope of the attached claims. Thus, while the invention has been particularly described in relation to a vehicle loading and unloading system, as previously indicated, it may be also applied to other forms of conveyor-type load-moving systems.

What is claimed:

1. A load moving system comprising
   a flexible conveyor element extending between a front wind-up roll and a back wind-up roll,
   drive means for winding the conveyor element selectively onto the respective rolls, and
   control means for automatically terminating operation of the drive means when the conveyor element has travelled a predetermined amount, the control means including a follower positioned to engage an outer surface portion of the conveyor element which is wound on one of said rolls, carrier means for the follower, means mounting the carrier means for movement radially inwardly and outwardly with respect to said one roll under the influence of the follower as the amount of the conveyor element on said one roll decreases and increases, a control device for terminating operation of the drive means, and a connection between the carrier means and the control device for operating the control device to terminate the drive means when the carrier means attains a predetermined radial position relative to said one roll determined by the amount of conveyor element wound on the one roll,
   the system comprises a loading and unloading system for a vehicle having a vehicle body with a bed, a front wall and a back opening through which the vehicle is loaded and unloaded, and wherein the conveyor element extends along the bed of the vehicle,
   the drive means being hydraulic motors,
   the control device comprises a three-way hydraulic valve having an inlet for receiving pressure fluid from a fluid source, outlets connected with the respective motors, a valve spool with a position connecting the inlet with one of the outlets, a second position connecting the inlet with the other outlet, and a third neutral position isolating the inlet from both of the outlets, and manual means for selectively moving the spool from the neutral position into the first and second positions, the carrier means through said connection being adapted to return the spool to the neutral position when the carrier means attains the first and second radial positions.

2. The invention as defined in claim 1 wherein the drive means includes a first motor for driving the front roll and a second motor for driving the back roll, wherein the control device has means for selectively operating each of said motor, and wherein the carrier means is combined with said connection in a manner for operating the control device to terminate actuating of the first motor when the carrier means attains a first radial position relative to said one roll and to terminate actuation of the second motor when the carrier means attains a second radial position relative to said one roll.

3. The invention as defined in claim 2 wherein said one roll is the back roll, wherein the first position is a radially inner position of the carrier with respect to the back roll, and wherein the second position is a radially outer position of the carrier with respect to the back roll.

4. In a load-moving system having a flexible conveyor element extending between front and rear wind-up rolls, a control mechanism for the belt including a first hydraulic motor for the rear roll for winding the belt onto the rear roll, a second hydraulic motor for the front roll for winding the belt onto the front roll, a control valve for selectively directing pressure fluid from a fluid source to the respective motors, the valve having a fluid inlet, first and second fluid outlets connected to the respective motors, and a valve spool for controlling fluid flow between the inlets and the outlets, the valve spool having a first position connecting the inlet with one of the outlets, a second position connecting the inlet with the other of the outlets, and a third neutral position isolating the inlet from both of the outlets, manual means for shifting the valve spool from the neutral position selectively into the first and second positions, and automatically operable means for returning the valve spool to the neutral position responsive to a predetermined amount of travel of the conveyor element, the automatically operable means including follower means contacting an outer surface portion of the conveyor element wound on one of said rolls for sensing changes in outer diameter of said one of said rolls, caused by an increasing and diminishing length of belt being wound on said one roll and said follower means being connected to said valve spool for returning the valve spool to the neutral position and thereby terminating the motor's operation when said outer diameter attains predetermined minimum and maximum values.

5. The invention as defined in claim 4 wherein the carrier means includes a carrier rod with front and rear trip members thereon and wherein the valve spool includes a trip lever connected for movement therewith between opposite terminal positions when the spool is moved from the neutral position to the respective first and second positions, the trip lever being located in a path of movement of the trip elements for being returned thereby from the respective terminal positions to the neutral position when said outer diameter of said one roll attains the minimum and maximum values.

6. The invention as defined in claim 5 wherein the system comprises a loading and unloading system for a vehicle and wherein the conveyor element extends along a bed of the vehicle.

7. The invention as defined in claim 6 wherein the carrier rod extends lengthwise of the vehicle and the manual means include an actuating lever linked to the trip lever, a shaft extending transversely of the vehicle which carries the actuating lever, and a manual control lever on said shaft at one side of the vehicle.

8. The invention as defined in claim 7 wherein the carrier rod and shaft are slung below a body of the vehicle.

9. The invention as defined in claim 6 wherein the trip elements are mounted for lengthwise adjustment on the carrier rod for varying said predetermined minimum and maximum values.

10. The invention as defined in claim 9 which further includes adjustment means for varying the length of the carrier rod.

* * * * *